United States Patent [19]
Hagen

[11] 3,877,219
[45] Apr. 15, 1975

[54] CONSTANT VOLUME COMBUSTION GAS TURBINE WITH INTERMITTENT FLOWS

[75] Inventor: Hermann Hagen, Dachau, Germany

[73] Assignee: Motoren-und Turbinen-Union Munich GmbH, Munich, Germany

[22] Filed: July 2, 1973

[21] Appl. No.: 375,755

[30] Foreign Application Priority Data
June 30, 1972 Germany............................ 2232025

[52] U.S. Cl. ............. 60/39.38; 60/39.39; 60/39.17; 60/39.66
[51] Int. Cl. ........................... F02c 5/02; F02d 5/02
[58] Field of Search.............. 60/39.38, 39.39, 39.4, 60/39.17, DIG. 11, 39.36, 39.66

[56] References Cited
UNITED STATES PATENTS

| | | | |
|---|---|---|---|
| 1,552,272 | 9/1925 | Carner................................ | 60/39.39 |
| 2,427,845 | 9/1947 | Forsyth............................... | 60/39.38 |
| 2,479,143 | 8/1949 | Traylor............................... | 60/39.38 |
| 2,608,055 | 8/1952 | Welsh................................. | 60/39.17 |
| 2,640,314 | 6/1953 | Abel ................................... | 60/39.36 |
| 2,738,645 | 3/1956 | Destiyal............................. | 60/39.17 |
| 2,809,493 | 10/1957 | Pavlecka............................ | 60/39.36 |
| 2,937,498 | 5/1960 | Schmidt............................. | 60/39.39 |
| 3,018,623 | 1/1962 | Birmann ........................... | 60/39.36 |
| 3,034,298 | 5/1962 | White ................................ | 60/39.66 |
| 3,269,119 | 8/1966 | Price................................... | 60/39.36 |
| 3,328,956 | 7/1967 | Seewald et al..................... | 60/39.06 |
| 3,381,471 | 5/1968 | Szydlowski........................ | 60/39.36 |
| 3,736,747 | 6/1973 | Warren......................... | 60/DIG. 11 |
| 3,751,909 | 8/1973 | Kohler............................... | 60/39.17 |

FOREIGN PATENTS OR APPLICATIONS
935,596   8/1963   United Kingdom................ 60/39.38

Primary Examiner—C. J. Husar
Assistant Examiner—Warren Olsen
Attorney, Agent, or Firm—Craig & Antonelli

[57] ABSTRACT

A gas turbine engine arrangement for constant volume combustion including a combustion chamber arranged downstream of a compressor supplying combustion air and upstream of a turbine accepting exhaust gases from the combustion chamber as driving gases. A closable valve is arranged between the combustion chamber and the compressor for intermittent blocking of the flow between the compressor and the combustion chamber during constant volume combustion within the combustion chamber, while the exit end of the combustion chamber leading to the turbine is continuously open. The geometric configuration of the combustion chamber and of the exit from the combustion chamber is such as to assure constant volume combustion without the necessity of additional valving means for closing off the exit end of the combustion chamber. Preferred embodiments of the invention utilize compressor pressure responsive inlet valves at the combustion chamber as well as compressor speed responsive valves, said valves including check valves and externally operable side valves. Several preferred embodiments of the combustion chamber are divided, which each include measures for assuring optimum stratification and combustion of the fuel and air mixture in respective separate zones thereof. The combustion chamber volume and cross-section as compared to the cross-section of the exit from the combustion chamber leading to the turbine is extremely large so as to facilitate the constant volume combustion.

67 Claims, 10 Drawing Figures

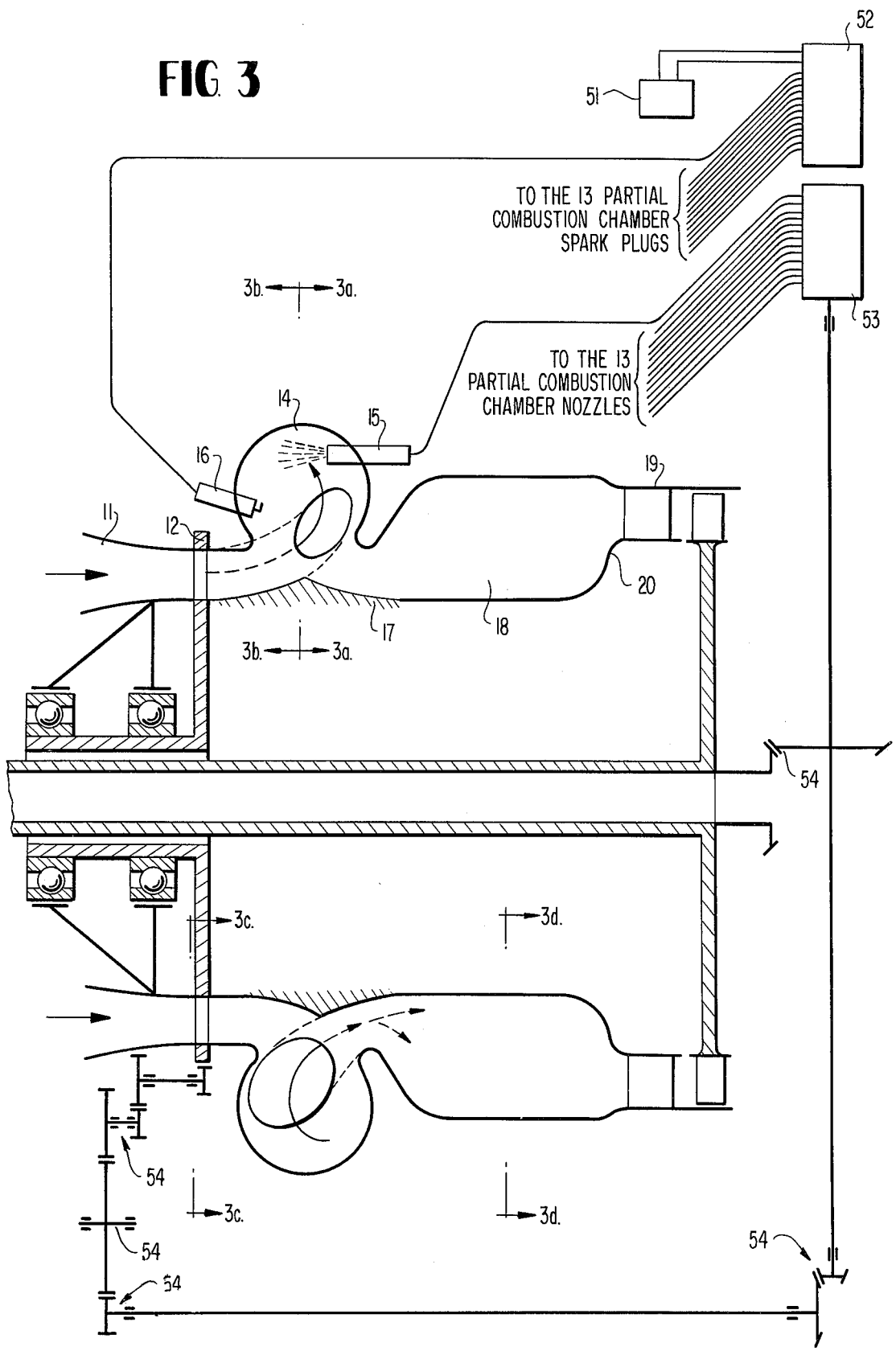

CONSTANT VOLUME COMBUSTION GAS TURBINE WITH INTERMITTENT FLOWS

BACKGROUND AND SUMMARY OF THE INVENTION

This invention relates to a gas turbine system and, more particularly, this invention relates to an engine for constant-volume combustion comprising a compressor, a turbine, and a combustion chamber arranged between the compressor and the turbine.

It has been contemplated to design internal combustion engines, especially gas turbine engines for controlled constant-volume combustion, such that the working medium is admitted into the combustion chamber through slide valves or other valves at the combustion inlet, and that the hot combustion gases issue from this combustion chamber through further slide valves or other valves at the turbine end of the combustion chamber. It has further been contemplated to provide several combustion chambers equally spaced around the circumference of the gas turbine. To improve the combustion cycle of the gas turbine engine for constant-volume combustion the combustion chambers are preceded by a compressor in which the incoming air is charged. Combustion is intermittent, where first fresh air enters when the control areas at the inlet and outlet are unblocked, then inlet and outlet valves close off the particular sectional combustion chamber, and fuel is injected in a manner comparable to that common in diesel engine or gas turbine practice, is ignited, the mixture burns and the pressure rises, and then the outlet valve opens and releases the highly energized hot gas into the turbine. The hot gases drive the compressor in its capacity as a straight compressor turbine or as a compound turbine which additionally emits effective energy.

A further contemplated version exhibits, downstream of the combustion chamber, a mixing chamber consisting of exactly as many sectional mixing chambers as the combustion chamber has sectional chambers, where each sectional mixing chamber communicates with the combustion chamber through at least one port and is intermittently operated in a conventional fashion by means of shut-off members. The combustion cycle in each sectional combustion chamber occurs periodically exactly as in the above described version. First, cold air is drawn in through the inlet port of the sectional combustion chamber. This cold air flows through the sectional combustion chamber and also fills the sectional mixing chamber. When both chambers are filled with fresh air, the shut-off members behind the sectional combustion chamber and the sectional mixing chamber close with respect to both the compressor and the turbine. Fuel is then injected into the sectional combustion chamber and is ignited and burned, causing a rise in temperature and pressure. Thereafter, the outlet member opens, hot gases expand into the mixing chamber, and in the process the charge air is compressed, partially mixed with hot gas and partially heated. The outlet member of the mixing chamber then opens to release preferably first the compressed fresh air and next the succeeding hot gas into the turbine.

Embodiments like the above described must be expected to give trouble from wear and thermal distortion of the control elements in the hot gas stream which operate at elevated temperatures and usually take the shape of annular rotary valves. This situation is aggravated by disadvantageous choking losses occurring during the opening of the control elements, said losses being particularly onerous by the throttling action between the combustion chamber and the turbine.

It is contemplated by this invention to eliminate the need for valves, and their attendant technical problems, in the hot gas stream and to provide a suitable design which maximally preserves the functional properties needed to promote the periodical combustion of a gas mixture accompanied by a rise in pressure and temperature and the subsequent expulsion into the turbine, where from the turbine aspect a favorable temperature gradient is achieved by stratifying the exhaust gases.

It is comtemplated in preferred embodiments of this invention to provide combustion chambers having means for introducing and lighting fuel at that end of each oblong combustion zone which faces the compressor, flow-wise, and to use a slide valve or other valve at that point to separate the compressor from the combustion chamber. This arrangement eliminates the need for complex and trouble-ridden outlet valves at the sectional combustion chamber, and when used otherwise, between the sectional combustion chamber and the mixing chamber. This arrangement likewise saves the mechanical energy needed to operate such outlet valves and prevents the throttling losses accompanying the opening movement of such shut-off valve elements. Additionally, the volume of the combustion chamber is related to the associated turbine inlet area such that the efflux from the combustion chamber is slower than the combustion of the combustion chamber content.

This invention further contemplates providing synchronizing means to couple the movements of the slide valves and/or other valves, as well as fuel injection and ignition, timing one with the other such that during or after the closure of the valve a metered amount of fuel is injected and then ignited in each combustion chamber section. This intermittent injection economizes fuel in that otherwise the fuel injected during the scavenging cycle is possibly no longer burned and in that the combustion process is more easily promoted when ignition is attuned to injection.

The present invention further comtemplates providing means assuring that the injected fuel quantity can be metered such that at maximum injection quantity in a primary zone of a combustion chamber, an overstoichiometric mixture will result. In this manner, complete combustion of the mixture is prevented in the primary zone and is delayed until in the secondary zone. This slows combustion and relieves pressure peaks while still further boosting the engine output.

This invention further contemplates providing a plurality of uniformly shaped combustion chambers symmetrically spaced over the circumference of the engine between the compressor and the turbine for greater uniformity of turbine energization.

This invention further contemplates providing an embodiment with a combustion cycle timing means which causes ignition to occur consecutively in circumferentially adjacent combustion chambers in a predetermined sense or rotation. This is the simplest form of ignition timing. Further improvement is afforded according to further embodiments contemplated by the present invention by timing the ignition so that the circumferentially adjacent combustion chamber is ignited not before its diametrically opposite counterpart is lit first. That is, alternate chambers at opposite diametric sides of the engine are sequentially ignited. This alleviates unilaterally acting loads on the turbine, especially on the first stage, associated with directly rotational ignition sequence.

In certain preferred embodiments contemplated by this invention, the combustion chamber exhibits a throated section approximately centrally between its compressor and turbine ends, dividing the combustion chamber into a primary and secondary zone. It is in the primary zone that the fuel is admitted and ignited. The throat somewhat impedes the expansion of the mixture after detonation and still boosts the pressure for improved thermodynamic efficiency.

In a further preferred embodiment contemplated by this invention, the primary zone is laterally shifted relative to the longitudinal axis of the overall combustion chamber and fitted with heat retaining walls and helical inlet and outlet ducts. This laterally displaced combustion zone forms the primary zone in which the fuel is conditioned, mixed and detonated, where the walls retain a portion of the heat released during combustion. The tangentially disposed inlet and outlet produce an air swirl in the spherical primary zone which is notably helpful in the conditioning of the fuel and its mixing with the primary air. Combustion proceeds at a somewhat faster rate and a portion of the heat is then transferred to the lined wall. During the scavenging cycle, when secondary air likewise flows through this spherical zone, the heat retained by the wall is absorbed by the secondary air. This somewhat moderates the shock of detonation and slightly heats the secondary air charge. Also, energization of the turbine is improved when during the course of combustion the charge air is exhausted first at a high pressure level but relatively low temperature. The turbine blades will then remain colder than they would when under the impact of high-velocity hot air. In accordance with the invention the hot air follows only after its velocity is at a moderate level.

A still further embodiment contemplated by the present invention exhibits a primary zone which abruptly flares out behind the valve on the compressor end and then narrows progressively towards the secondary zone and the outlet on the tubine side. In this greatly flared primary zone the abrupt increase in cross-sectional area is the origin of strong backflow which assists in the conditioning and mixing of the fuel much as it does in the spherical combustion chamber. Importantly, this embodiment will be easier to manufacture than the spherical version due to the more simplified geometric shape of the combustion chamber.

The overall length of an engine arrangement in accordance with the preferred embodiments of the present invention is considerably reduced by deploying the combustion chambers circumferentially around the turbine. Also, the valves can be self-acting check valves so as to avoid the need for mechanical actuating and control mechanisms for the valves. Other preferred embodiments contemplated by the present invention utilize externally controlled slide valves which enable a more exactly timed actuation and optimum control of the cross-sectional areas to be achieved than with the check valves.

In order to prevent the velocity of flow through the combustion chamber from exceeding the rate of flame propagation and other maxima, the cross-sectional area of the cmbustion chamber should be more than 15 times the size of the associated area of the turbine nozzle segment according to the present invention.

The time required for a gas change and with it the pulse frequency depends on the ratio of combustion chamber volume to turbine nozzle segment area. This makes it necessary according to the present invention to make the combustion chamber volume large in proportion to the nozzle exit area if exceedingly high pulse frequencies and the accompanying rapid valve movements and excessive flow losses shall be avoided.

The performance of the engine arrangement contemplated by the present invention depends on the utimate compressor pressure and again on the throughput and thus on the number of gas changes per second, i.e., on the number of valve openings per unit time. The engine performance can further be affected by metering the injection fuel and so controlling the temperature level.

In preferred embodiments of the present invention with the valve movement related to compressor speed, the engine output can simply be controlled by metering the injection fuel flow. The simplest method of coupling compressor speed with valve control according to the present invention is by proportional control via a rigid mechanical connection and possibly a mechanical drive. According to other preferred embodiments of the present invention, this method of control can similarly be implemented also as a function of the ultimate compressor pressure which is directly related to compressor speed.

In preferred embodiments of the present invention where it is intended to make the gasdynamic energy furnished by the gas generator independent speedwise of the output required for propulsion, the turbine is divided into two mechanically independent groups of which one drives the compressor while the other serves to produce effective output.

In preferred embodiments of the present invention where it is intended to produce thrust rather than mechanical effective output, then the power turbine is replaced with a thrust nozzle.

The vigorous detonations in the combustion chamber are the cause of pressure surges and vibrations at its turbine end which may produce excessive stresses in particularly the first several stages of the turbine. In order to balance these pulsating vibrations at least for the turbine stages succeeding the first, an adequately sized compensating chamber is provided behind the first turbine stage according to the present invention.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 3 is a schematic, partial cross-sectional view which illustrates a gas turbine engine for constant volume combustion having a cmbustion chamber arranged in accordance with a second embodiment of the present invention which has primary zones or swirl chambers which are radially displaced towards the outside;

DETAILED DESCRIPTION OF THE DRAWINGS

Figure 1:
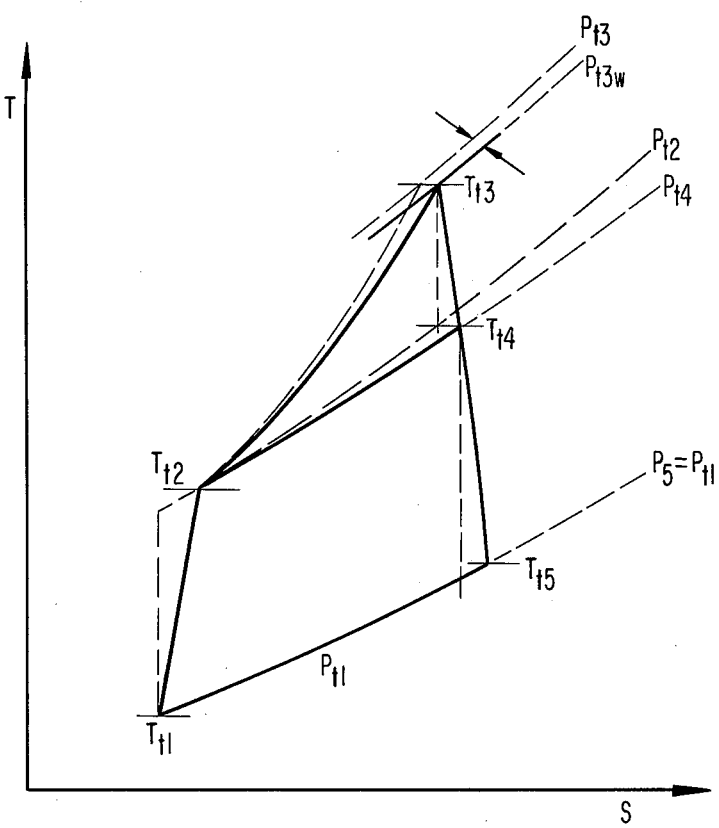
FIG. 1 graphically illustrates the combustion cycle of a gas turbine system for controlled constant-volume combuston.

With reference now to FIG. 1, the combustion cycle shown thereon takes the following course;

The original condition at inlet pressure $P_{t1}$ and temperature $T_{t1}$ changes by compression to $P_{t2}$ at a temperature $T_{t2}$. At this condition the air flows into the constant-volume combustion chamber which is then closed off. After admission of fuel and combustion, the pressure in the primary zone rises to $P_{t3w}$ and the temperature to $T_{t3}$. A certain pressure drop with respect to the ideal pressure $P_{t3}$ is apparent. The gases expand intermittently from the total pressure in the combustion chamber, in the first turbine stage to the scavenging pressure $P_{t4}$ which prevails in a manifolding chamber and ranges slightly below the compressor pressure. From there, expansion takes place in a continuously working, fully energized turbine to a back pressure $P_5$. The output of the compressor is sustanied by a portion of the turbine output, the balance being available for effective output. In the FIG. 1 diagram, S indicates specific entropy that has the dimension m/grd, wherein m equal unit length in meters, and grd equal temperature difference in degrees Celsius. Also in this FIG. 1, T indicates absolute temperature in degrees Kelvin.

In each of the illustrated preferred embodiments, a valve 1, 12, 22, 47, 34 is provided for intermittently closing off communication between a compressor (the compressor is designated only schematically by the large arrow in each figure arranged immediately upstream or to the left in the figures of the respective valves at the combustion chamber) and primary zone of a combustion chamber. Also in each of the illustrated embodiments the combustion chamber and the outlet from the combustion chamber to the turbine in configured so as to assure a substantially constant-volume combustion process without utilizing additional closure valves downstream of the combustion chamber to block flow from the combustion chamber to the turbine during the combustion process.

Figure 2:
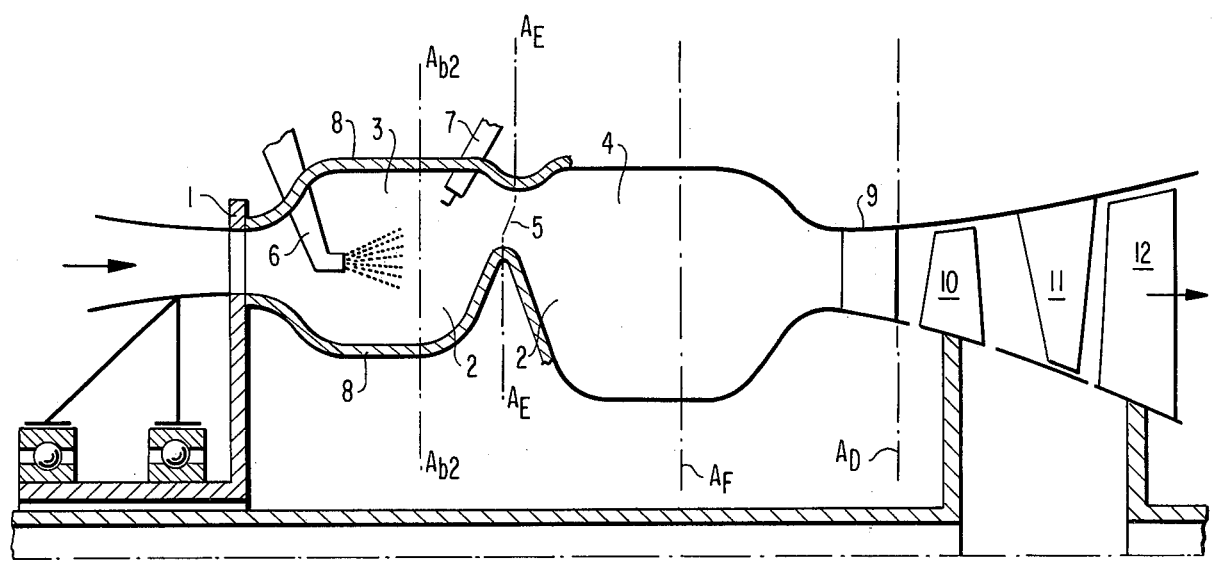
FIG. 2 is a schematic partial cross-sectional view which illustrates a gas turbine engine for constant-volume combustion having a combustion chamber arranged in accordance with a first embodiment of the present invention which exhibits an abrupt contraction of the cross-sectional area between the primary and the secondary zones.
Figure 3A:
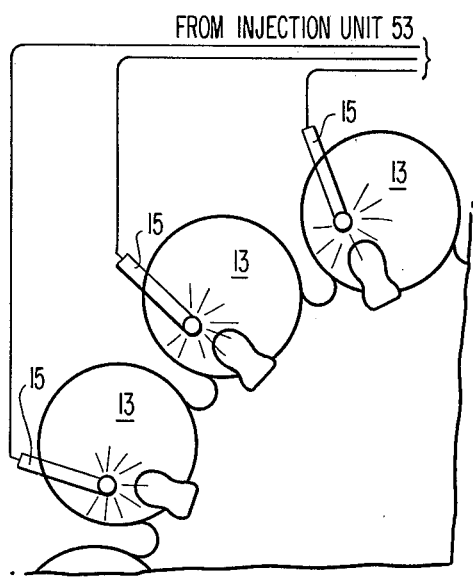
FIG. 3a is a schematic view taken along section line 3a—3a of FIG. 3 and showing the fuel injection arrangement for a plurality of primary combustion zones in one quadrant of the engine of FIG. 3.
Figure 3B:
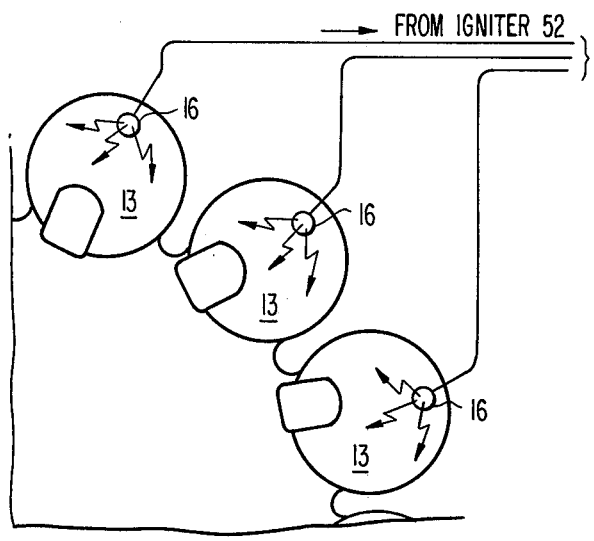
FIGS. 3b, 3c and 3d are views similar to FIG. 3a which are taken along section lines 3b—3b, 3c—3c, and 3d—3d, respectively of FIG. 3.
Figure 3C:
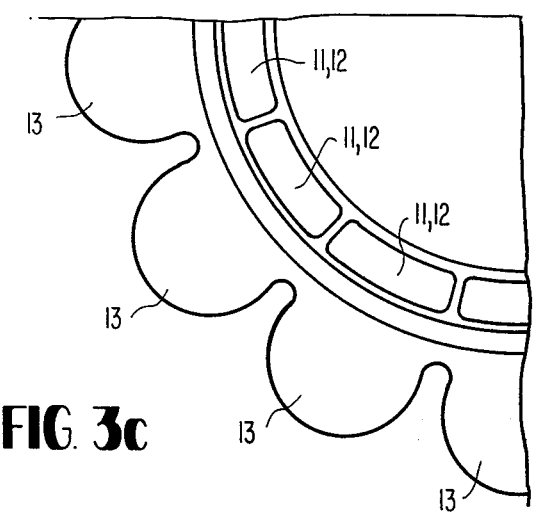
Figure 3D:
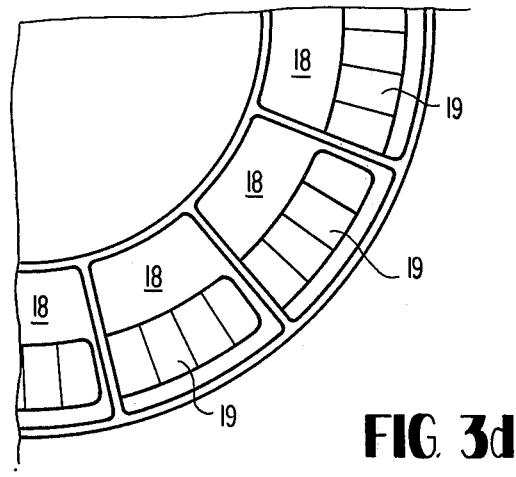

FIG. 2 shows a turbine system arrangement with constant-volume combustion chamber 2. At the compressor end of the combustion chamber a valve 1 is provided for selectively interrupting flow between the compressor and combustion chamber 2. Valve 1 is represented in FIG. 2 as a rotary type valve. The combustion chamber 2 is divided into a primary zone 3 and a secondary zone 4, the zones being separated by a throat area 5. Fuel is admitted intermittently through a nozzle 6 and ignited by a spark plug 7. The primary zone 3 is clad or covered with an insulating layer 8. The heat retained by the primary zone 3 during combustion in the primary zone is emitted during scavenging. The gases burned in the zone 3 grow in pressure and drive the charge air in zone 4 ahead of them and into the nozzle 9. The gases issuing from the nozzle 9 impinge on the turbine rotor 10 succeeded by a further turbine (not shown) for continuous energization. In order to improve combustion it will be expedient to keep the mixture in primiary zone 3 low in excess air or even over-rich and to charge the secondary zone 4 with unheated air. In the preferred arrangements, the unheated charging air also passes through both zones of the partial combustion chambers from the compressor.

In preferred arrangements of the present invention, the ratio of the cross-sectional area of a partial combustion chamber to the narrowest cross section of the associated nozzle outlet section equals at least 15. See FIG. 2, wherein $A_{b2}$ designates the cross-sectional area of the partial combustion chamber and $A_D$ designates the narrowest cross section of the associated nozzle outlet section. In further preferred arrangements of the present invention, the ratio of volume of the partial combustion chamber to the narrowest cross section of the asociated nozzle exit section equals at least 2000cm$^3$/cm$^2$. The just-mentioned cross-sectional area ratio and volume to area ratio relate to preferred dimensioning arrangements for the present system arrangement of the present invention. These preferred dimensions are directed to avoiding, on the one hand, that the flow velocity in the combustion chamber becomes too high and the flame could be blown away (in case of ratio values as described above which are too small) or, on the other hand, to avoid that the frequency of the explosions and thus the efficiency becomes too low, due to a maximally long exhaust time (in case of ratio values which are too large, it being noted that the above-mentioned ratios of 15 and 2000cm$^3$/cm$^2$ are preferred optimum ratios and not fixed minimum ratios).

In FIG. 2, $A_E$ designates the throat cross-sectional area, which area preferably is on the order of two to three times as large as the partial nozzle exit area $A_D$. $A_F$ indicates the cross-sectional area of partial mixing chamber or secondary zone 4, which area can be larger or smaller than $A_{b2}$, but preferrably is on the same order of magnitude. Although corresponding cross-sectional area indications have not been depicted on the drawing illustrations for the other embodiments, it will be understood that similar preferred ratios of these areas, especially the areas corresponding to $A_{b2}$ and $A_D$ are likewise applicable to these other figures. For example, in FIG. 3, the area $A_{b2}$ would relate to the diameter of the primary swirl chamber found in FIG. 4, the corresponding area would be approximate average diameter across the single combustion chamber space near the primary zone thereof.

FIG. 3 illustrates an arrangement where the primary and secondary zones are shaped to promote the formation and stratification of the fuel and air mixture. The air from the compressor flows through the combustion chamber inlet 11, after a slide valve area 12 has been unblocked or opened, and into the primary combustion zone 13 characterized by a swirling chamber 14. Extending through the wall of the swirling chamber is an injection nozzle 15 and a spark plug 16. A transitional area 17 behind or immediately downstream of the primary combustion zone 13 is circumferentially displaced (not shown) with respect to the inlet 11 and directs the gases into the secondary zone 18. In order not to have the gases routed immediately to the exhaust pipe 19 but to have them first displace and partially mix with the secondary air, deflector 20 is provided. Early in the exhaust phase, unheated air is expelled which is followed not until later in the cycle by heated mixed air. Helical inlets and outlets may be provided at respective opposite ends of the combustion chamber and heat retaining walls in the manner described above for primary zone 3 of FIG. 2 may be provided for chamber 14 of the FIG. 3 embodiment.

FIG. 3 also schematically depicts a battery 51 connected to igniter 52 which has a distributor for controlling ignition signals to the spark plugs 16 of the respective chambers 14 arranged circumferentially around the centerline of the engine. In a like manner, reference numeral 53 schematically depicts an injection pump for supplying fuel to the injection nozzles 15 associated with the respective chambers. Reference numeral 54 designates the various gearing arrangements schematically illustrated for synchronously controlling the timing of the opening of the flat valve area 12, the timing of the injection mechanism and the timing of the ignition mechanism. The devices serving for the fuel injection can be similar to those conventionally employed in diesel engines. Also, the ignition devices can be similar to those of internal reciprocating combustion engines, except that spark plugs of a higher sparking energy are required in the event diesel fuel is to be used. Although the gearing schematically designated by reference numeral 54 indicates a fixed proportional relationship of the various timing mechanisms to the turbine shaft limitation, such fixed proportion is not necessary, said schematic representation in FIG. 3 being included to clearly illustrate a complete system. Further details of the ignition and injection devices 52 and 53 are not included herein, since devices of known construction can be utilized, and such details would only obscure the disclosure of the pertinent features of the present invention. For example, conventional devices as described in detail in the Manual of Automobile Technology by Bussien of 1965 could be utilized in conjunction with the present invention, one skilled in art being able to utilize such previous disclosure in conjunction with the present disclosure to practice the present invention. (the referred to manual is a German publication titled "Automobiltechnisches Handbuch von Bussien.") FIGS. 3a, 3b, 3c and 3d are taken respectively along corresponding section lines of FIG. 3 and are included to schematically illustrate the positioning of the various elements in the plurality of circumferentially arranged and spaced chambers 11 with primary combustion zones 15.

Figure 4:
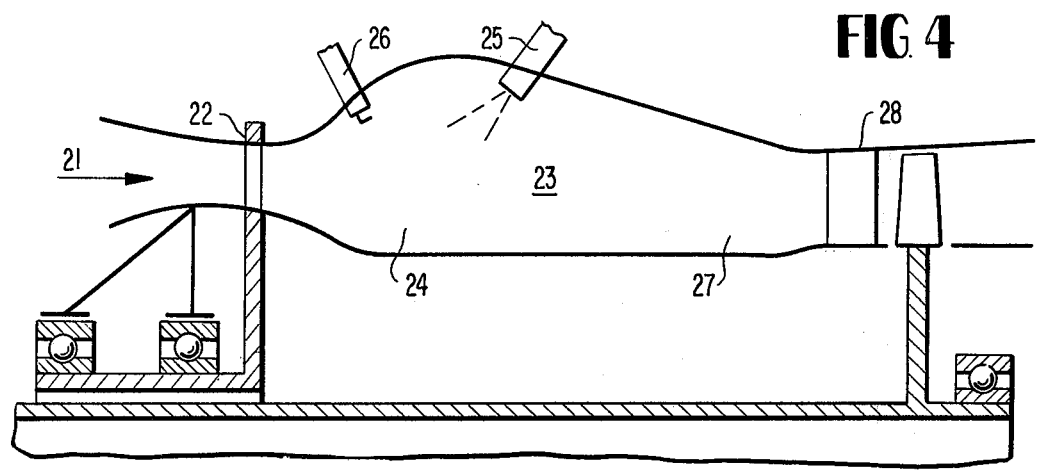
FIG. 4 is a schematic, partial cross-sectional view which illustrates a gas turbine engine for constant volume combustion having an oblong combustion chamber arranged in accordance with a further embodiment of the present invention which has an abruptly flared primary zone which is not separated from the secondary zone spacewise.

Stratification of the combustion gases and the secondary air, as well as a reduction in the CO content of the exhaust gases, can also be achieved without resort to a throat in the cross-sectional area of the combustion chamber when a rich mixture is produced and ignited in a confined area of the combustion chamber. A schematical arrangement of such a combustion chamber is shown in FIG. 4. Let the inlet 21 be controlled by a slide valve or valve 22 which is succeeded by an oblong combustion chamber 23. The combustion chamber exhibits a local flare 24 where backflow is generated as the gases flow in. In this zone, fuel is injected through a nozzle 25 and ignited by a spark plug 26. A rich mixture for thorough ignition is produced only near the spark plug. As it burns off, it causes a pressure rise which shoves the cold charge air at 27 ahead of it and forces it first through the narrow turbine nozzle 28. The latter is dimensioned such that the escape time is multiple of the combustion time. In order to optimize the relationship of escape time to combustion time, the ratio of the areas in the combustion chamber cross-section $A_{b2}$ to the corss-section $A_D$ of the turbine guide apparatus is preferrably in the order of magnitude or greater than 15 : 1 (See FIG. 2 and discussion associated therewith for further details of the preferred conventional ratios to be utilized in conjunction with the engines of the present invention.).

Figure 5:
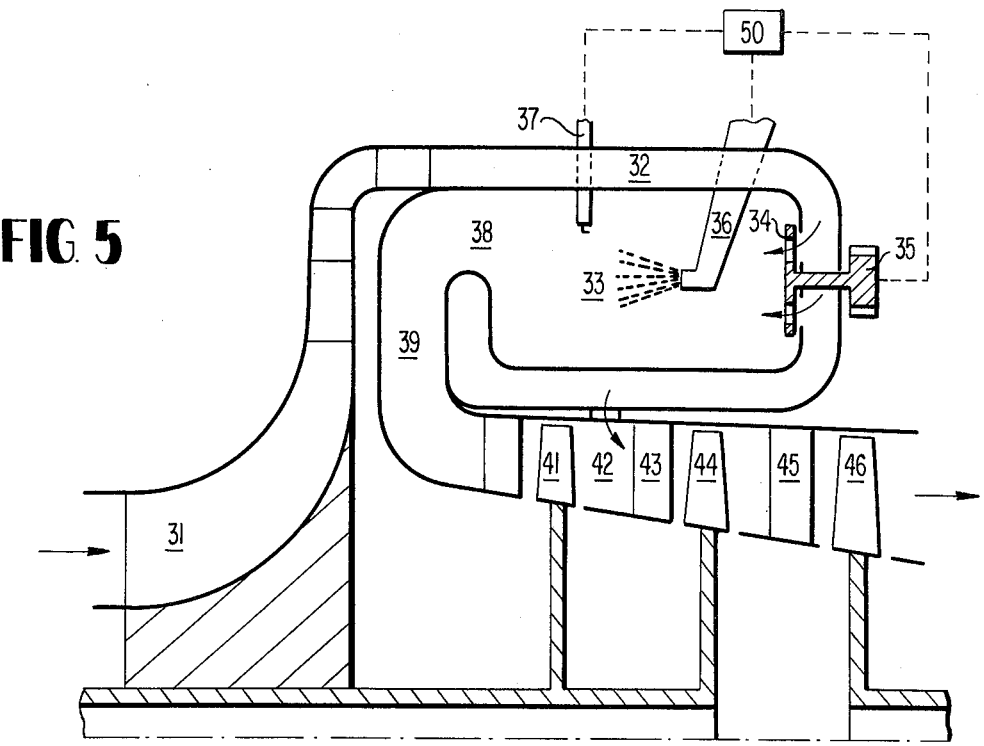
FIG. 5 is a schematic, partial cross-sectional view which illustrates a gas turbine engine for constant-volume combustion arranged in accordance with the present invention and having combustion chambers which are spaced around the turbine section and operated by externally controlled valves.

FIG. 5 is a schematical arrangement illustrating a complete engine. A single-stage radial-flow compressor 31 is followed by air inlet ducts 32 and combustion chambers 38 which are radially arranged around the circumferential exterior of the turbine and comprise primary zones 33 and secondary zones 39. Intermittent fuel admission is through injection nozzles 36, and ignition is by spark plugs 37. Arranged behind the rotor 41 of the first compressor turbine stage is a compensating chamber 42 which precedes the stator and rotor wheels 43, 44 of the second stage of the compressor turbine. This compressor turbine is ultimately followed by a power turbine having a guide wheel 45 and a rotor 46.

Figure 6:
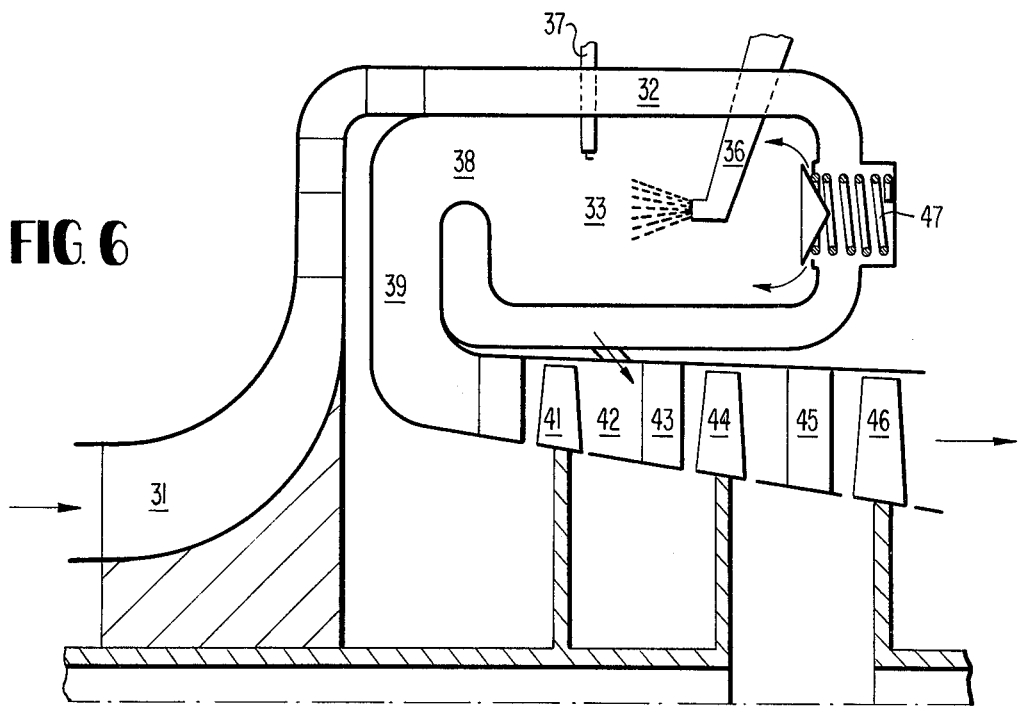
FIG. 6 is a view similar to FIG. 5 which illustrates a further embodiment of a gas turbine system for constant-volume combustion according to the present invention which utilizes check valves.

In FIG. 5 each combustion chamber has an externally controlled rotary valve 34 which is mechanically actuated via a pinion 35 to control the air inlet. Pinion 35 can be connected by a governor at a compressor output shaft so as to control the valve 34 as a function of compressor speed. FIG. 6 illustrates an engine arrangement similar to FIG. 5 except that the air enters the combustion chamber through an autonomously or automatically opening check valve 47 which is automatically responsive to compressor outlet pressure.

Control installation 50 (FIG. 5) includes control elements for governing the timing of the operation of valves 4, the injection nozzles 6, and the spark plugs 7 associated with each of the respective separate combustion chambers 38 arranged around the turbine. This control installation 50 includes means for effecting successive combustion of circumferentially adjacent combustion chambers. Alternatively, control installation 50 can include means for effecting successive combustion of diametrically opposite combustion chambers so as to balance the forces on the system with respect to an engine centerline extending centrally of said combustion chambers. Since ignition, injection, and valve timing mechanisms of known construction can be used by one skilled in the art, given the present disclosure, in constructing such a control installation 50, the details thereof are included in FIG. 5 only schematically so as not to obscure the present invention. However, see FIG. 3 and associated description for further details of a multi-combustion chamber arrangement according to the present invention, which includes schematically illustrated ignition, inlet valve, and fuel injection timing and control features.

It is further noted that the two arrangements of FIGS. 5 and 6, which relate to an illustration of a complete flow path through the engine and through a single combustion chamber, could also be used in conjunction with the specific combustion chamber designs of FIGS. 2, 3 and 4. However, in such engines equipped with radial-flow compressors, it would be more preferrable to dispose the combustion chambers around the turbine in order to save room. It is further noted that each of the arrangements of FIGS. 5 and 6 could be used with a plurality of partial combustion chambers arranged in a manner similar to that shown in FIG. 3, it being also noted that FIGS. 2 and 4 contemplate plurality of combustion chambers arranged as in FIG. 3.

While I have shown and described several embodiments in accordance with the present invention, it is understood that the same is not limited thereto but also contemplates numerous changes and modifications as would be known to those skiled in the art given the present disclosure of the invention, and I therefore do not wish to be limited to the details shown and described herein only schematically but intend to cover all such changes and modifications.

What is claimed is:

1. A gas turbine engine arrangement for constant volume combustion comprising:
 combustion chamber means,
 compressor means arranged upstream of said combustion chamber means,
 air supplying means for supplying air from said compressor means to said combustion chamber means,
 ignition means for igniting a mixture of fuel and a portion of said air in said combustion chamber means,
 turbine means arranged downstream of said combustion chamber means,
 exhaust gas accepting means for accepting exhaust gases from said combustion chamber means as driving gases for said turbine means,
 movable valve means for selectively interrupting communication between said compressor means and said combustion chamber means by closing off said air supplying means at least part of the time when constant volume combustion is occurring in said combustion chamber means,
 and control means for controlling said valve means and ignition means such that said exhaust gases are made up of alternating flows of hot combustion gases and cooling air with said cooling air being forced out of said combustion chamber means by and ahead of the following hot combustion gases.

2. An arrangement according to claim 1, wherein said exhaust gas accepting means is continuously open between said combustion chamber means and said turbine means during operation of said engine including during said constant volume combustion, and wherein said combustion chamber means and exhaust gas accepting means are configured to assure said constant volume combustion with said continuously open exhaust gas accepting means.

3. An arrangement according to claim 2, wherein an end of said combustion chamber means which faces the flow of air from said compressor means includes fuel admitting means for admitting fuel to said combustion chamber means and the igniting means for igniting said fuel and combustion air supplied by said combustion air supplying means.

4. An arrangement according to claim 3, wherein said fuel admitting means includes means for metering said fuel and injection means for intermittently injecting fuel into said combustion chamber means, wherein said igniting means includes means for intermittently igniting said combustion air and fuel, wherein said combustion air supplying means includes line means interconnecting said compressor means with said combustion chamber means by way of said valve means, and wherein said valve means is movable between an open position communicating said compressor means and combustion chamber means and a closed position interrupting communication between said compressor means and combustion chamber means, wherein said fuel admitting means and igniting means are operable to inject a metered amount of fuel into said combustion chamber means and thereafter ignite said fuel and combustion air, further comprising valve control means for moving said valve means to said closed position during at least one of during and shortly before said ignition with said fuel and combustion air.

5. An arrangement according to claim 4, wherein said fuel admitting means including means for forming an overstoichiometric fuel and combustion air mixture adjacent said end of said combustion chamber means which faces the flow of air from said compressor means during maximum fuel injection conditions.

6. An arrangement according to claim 5, wherein said combustion chamber means includes a plurality of separate similar combustion chambers disposed between the compressor means and the turbine means.

7. An arrangement according to claim 6, wherein said separate combustion chambers are arranged circumferentially adjacent one another about an engine centerline.

8. An arrangement according to claim 7, further comprising combustion cycle timing means for controlling said igniting means such that ignition occurs successively in circumferentially adjacent combustion chambers.

9. An arrangement according to claim 7, further comprising combustion cycle timing means for controlling said igniting means such that ignition occurs successively in circumferentially adjacent combustion chambers and alternately with diametrically opposite combustion chambers.

10. An arrangement according to claim 4, wherein said combustion chamber means includes primary zone means positioned downstream of said compressor means for accepting air flow from said combustion air supplying means and secondary zone means positioned downstream of said primary zone means and upsteam of said turbine means, wherein a throat means having a cross-sectional area smaller than the cross-section of said primary and secondary zone means communicates said primary and secondary zone means with one another, and wherein said fuel admitting means and igniting means are arranged such that said igniting of the fuel and combustion air takes place in said primary zone means.

11. An arrangement according to claim 7, wherein each of said separate combustion chambers includes a primary zone positioned downstream of said compressor means for accepting air flow from said combustion air supplying means and a secondary zone positioned downstream of said primary zone and upstream of said turbine means, wherein each separate combustion chamber includes a throat section having a cross-sectional area smaller than the cross-section of said primary and secondary zones which communicates said primary and secondary zones with one another, and wherein said fuel admitting means and igniting means are arranged such that said igniting of the fuel and combustion air takes place in said primary zones.

12. An arrangement according to claim 11, further comprising combustion cycle timing means for controlling said igniting means such that ignition occurs successively in circumferentially adjacent combustion chambers.

13. An arrangement according to claim 11, further comprising combustion cycle timing means for controlling said igniting means such that ignition occurs successively in circumferentially adjacent combustion chambers and alternately with diametrically opposite combustion chambers.

14. An arrangement according to claim 4, wherein said combustion chamber means includes primary zone means positioned downstream of said compressor means for accepting air from said combustion air supplying means and secondary zone means positioned downsteam of said primary zone means and upstream of said turbine means, wherein said primary zone means is constructed as swirl chamber means which is laterally displaced with respect to a longitudinal centerline of the combustion chamber means and exhibits heat retaining walls, wherein helical inlet and outlet ducts connect said swirl chamber means respectively with said combustion air supplying means and said secondary zone means, and wherein said fuel admitting means and igniting means are arranged such that said igniting of the fuel and combustion air takes place in said swirl chamber means.

15. An arrangement according to claim 7, wherein each of said separate combustion chambers includes a primary zone positioned downstream of said compressor means for accepting air flow from said combustion air supplying means and a secondary zone positioned downstream of said primary zone and upstream of said turbine means, wherein each of said primary zones is constructed as a swirl chamber which is laterally displaced with respect to a longitudinal centerline of said respective combustion chamber and exhibits heating retaining walls, wherein helical inlet and outlet ducts connect each of said swirl chambers respectively with said combustion air supplying means and a respective secondary zone of the associated combustion chamber, and wherein said fuel admitting means and igniting means are arranged such that said igniting of the fuel and combustion air takes place in said swirl chambers.

16. An arrangement according to claim 15, further comprising combustion cycle timing means for controlling said igniting means such that ignition occurs successively in circumferentially adjacent combustion chambers.

17. An arrangement according to claim 15, further comprising combustion cycle timing means for controlling said igniting means such that ignition occurs successively in circumferentially adjacent combustion chambers and alternately with diametrically opposite combustion chambers.

18. An arrangement according to claim 4, wherein said combustion chamber means includes primary zone means positioned downstream of said compressor means for accepting air flow from said combustion air supplying means and secondary zone means positioned downstream of said primary zone means and upstream of said turbine means, and wherein the cross-section of the primary zone means is larger than the cross-section of the secondary zone means by an amount sufficient to cause backflow of gases in said combustion chamber means in boundary areas between said primary and secondary zone means.

19. An arrangement according to claim 7, wherein each of said combustion chamber means includes a primary zone positioned downstream of said compressor means for accepting air flow from said combustion air supplying means and a secondary zone positioned downstream of said primary zone and upstream of said turbine means, and wherein the cross-section of each of said primary zones is larger than the cross-section of associated secondary zones by an amount sufficient to cause backflow of gases in each of said combustion chambers in boundary areas between primary and secondary zones.

20. An arrangement according to claim 19, further comprising combustion cycle timing means for controlling said igniting means such that ignition occurs successively in circumferentially adjacent combustion chambers.

21. An arrangement according to claim 19, further comprising combustion cycle timing means for controlling said igniting means such that ignition occurs successively in circumferentially adjacent combustion chambers and alternately with diametrically opposite combustion chambers.

22. An arrangement according to claim 1, wherein said valve means include automatic check valve means which are movable in response to pressure forces at respective opposite sides thereof.

23. An arrangement according to claim 1, wherein said valve means include slide valve means operable by external control means.

24. An arrangement according to claim 4, wherein said valve means include automatic check valve means which are movable in response to pressure forces at respective opposite sides thereof.

25. An arrangement according to claim 4, wherein said valve means include slide valve means operable by external control means.

26. An arrangement according to claim 11, wherein said valve means include automatic check valve means which are movable in response to pressure forces at respective opposite sides thereof.

27. An arrangement according to claim 15, wherein said valve means includes automatic check valve means which are movable in response to pressure forces at respective opposite sides thereof.

28. An arrangement according to claim 19, wherein said valve means include automatic check valve means which are movable in response to pressure forces at respective opposite sides thereof.

29. An arrangement according to claim 11, wherein said valve means include slide valve means operable by external control means.

30. An arrangement according to claim 15, wherein said valve means include slide valve means operable by external control means.

31. An arrangement according to claim 19, wherein said valve means include slide valve means operable by external control means.

32. An arrangement according to claim 1, wherein the cross-sectional area of the entire combustion chamber means taken in a direction transverse to the direction of flow through said combustion chamber means is greater than 15 times the minimum cross-sectional area of the exhaust gas accepting means leading from said combustion chamber means to said turbine means.

33. An arrangement according to claim 2, wherein the cross-sectional area of the entire combustion chamber means taken in a direction transverse to the direction of flow through said combustion chamber means is greater than 15 times the minimum cross-sectional area of the exhaust gas accepting means leading from said combustion chamber means to said turbine means.

34. An arrangement according to claim 4, wherein the cross-sectional area of the entire combustion chamber means taken in a direction transverse to the direction of flow through said combustion chamber means is greater than 15 times the minimum cross-sectional area of the exhaust gas accepting means leading from said combustion chamber means to said turbine means.

35. An arrangement according to claim 34, wherein said valve means include automatic check valve means which are movable in response to pressure forces at respective opposite sides thereof.

36. An arrangement according to claim 34, wherein said valve means include slide means operable by external control means.

37. An arrangement according to claim 2, wherein the volume of the combustion chamber means is extremely large as compared with the minimum cross-sectional area of the exhaust gas accepting means leading from said combustion chamber means to said turbine means.

38. An arrangement according to claim 37, wherein the ratio of the volume of the combustion chamber means to the minimum cross-section of the exhaust gas accepting means is at least 2000 $cm^3/1\ cm^2$.

39. An arrangement according to claim 4, wherein the volume of the combustion chamber means is extremely large as compared with the minimum cross-sectional area of the exhaust gas accepting means leading from said combustion chamber means to said turbine means.

40. An arrangement according to claim 39, wherein the ratio of the volume of the combustion chamber means to the minimum cross-section of the exhaust gas accepting means is at least 2000 $cm^3/1\ cm^2$.

41. An arrangement according to claim 11, wherein the ratio of the volume of the combustion chamber means to the minimum cross-section of the exhaust gas accepting means is at least 2000 $cm^3/1\ cm^2$.

42. An arrangement according to claim 15, wherein the ratio of the volume of the combustion chamber means to the minimum cross-section of the exhaust gas accepting means is at least 2000 $cm^3/1\ cm^2$.

43. An arrangement according to claim 19, wherein the ratio of the volume of the combustion chamber means to the miniumum cross-section of the exhaust gas accepting means is at least 2000 $cm^3/1\ cm^2$.

44. An arrangment according to claim 7, wherein said control means includes valve control means for controlling said valve means as a function of compressor speed, said valve means including a separately operable valve for each of said combustion chambers.

45. An arrangement according to claim 7, wherein said control means includes valve control means for controlling said valve means as a function of compressor outlet pressure, said valve means including a separately operable valve for each of said combustion chambers.

46. An arrangment according to claim 2, wherein said control means includes valve control means for controlling said valve means as a function of compressor speed.

47. An arrangement according to claim 2, wherein said control means includes valve control means for controlling said valve means as a function of compressor outlet pressure.

48. An arrangement according to claim 4, wherein said valve control means includes means responsive to compressor speed for controlling said valve means.

49. An arrangement according to claim 4, wherein said valve control means includes means responsive to compressor outlet pressure for controlling said valve means.

50. An arrangement according to claim 44, wherein the cross-sectional area of the entire combustion chamber means taken in a direction transverse to the direction of flow through said combustion means is greater than 15 times the minimum cross-sectional area of the exhaust gas accepting means leading from said combustion chamber means to said turbine means.

51. An arrangement according to claim 45, wherein the cross-sectional area of the entire combustion chamber means taken in a direction transverse to the direction of flow through said combustion chamber means is greater than 15 times the minimum cross-sectional area of the exhaust gas accepting means leading from said combustion chamber means to said turbine means.

52. An arrangement according to claim 44, wherein the ratio of the volume of the combustion chamber means to the minimum cross-section of the exhaust gas accepting means is at least 2000 $cm^3/1\ cm^2$.

53. An arrangement according to claim 45, wherein the ratio of the volume of the combustion chamber means to the minimum cross-section of the exhaust gas accepting means is at least 2000 $cm^3/1\ cm^2$.

54. An arrangement according to claim 2, wherein said turbine means includes two mechanically independent turbine groups including a compressor turbine group for driving the compressor means and a power turbine group for producing effective engine output energy.

55. An arrangement according to claim 46, wherein said turbine means includes two mechanically independent turbine groups including a compressor turbine group for driving the compressor means and a power turbine group for producing effective engine output energy.

56. An arrangement according to claim 47, wherein said turbine means includes two mechanically independent turbine groups including a compressor turbine group for driving the compressor means and a power turbine group for producing effective engine output energy.

57. An arrangement according to claim 2, wherein said turbine means consists only of a compressor turbine group and wherein a thrust nozzle is communicated with said exhaust gas accepting means.

58. An arrangement according to claim 46, wherein said turbine means consists only of a compressor turbine group and wherein a thrust nozzle is communicated with said exhaust gas accepting means.

59. An arrangement according to claim 47, wherein said turbine means consists only of a compressor turbine group and wherein a thrust nozzle is communicated with said exhaust gas accepting means.

60. An arrangement according to claim 2, wherein a flow compensating chamber in communication with said compressor means at a position upstream of said combustion chamber means is provided immediately downstream of a first turbine of said turbine means.

61. An arrangement according to claim 4, wherein a flow compensating chamber in communication with said compressor means at a position upstream of said combustion chamber means is provided immediately downsteam of a first turbine of said turbine means.

62. An arrangement according to claim 11, wherein a flow compensating chamber in communication with said compressor means at a position upstream of said combustion chamber means is provided immediately downstream of a first turbine of said turbine means.

63. An arrangement according to claim 15, wherein a flow compensating chamber in communication with said compressor means at a position upstream of said combustion chamber means is provided immediately downstream of a first turbine of said turbine means.

64. An arrangement according to claim 19, wherein a flow compensating chamber in communication with said compressor means at a position upstream of said combustion chamber means is provided immediately downstream of a first turbine of said turbine means.

65. An arrangement according to claim 1, wherein said control means includes means for sequentially:
opening said valve means to permit filling of said combustion chamber means with air with that portion of said air first entering said combustion chamber means serving as said cooling air and that portion of said air last entering said combustion chamber means serving as combustion air which is to be mixed with fuel,
closing said valve means,
and igniting said combustion air mixed with fuel to form said hot combustion gases,
whereby said cooling air is supplied to said exhaust gas accepting means at a higher pressure and velocity than the following hot combustion gases with a consequent improved cooling effect on said turbine means.

66. An arrangement according to claim 65, wherein said exhaust gas accepting means is continuously open between said combustion chamber means and said turbine means during operation of said engine including during said constant volume combustion, and wherein said combustion chamber means and exhaust gas accepting means are configured to assure said constant volume combustion with said continuously open exhaust gas accepting means.

67. An arrangement according to claim 55, wherein said combustion chamber means includes primary zone means where ignition and combustion takes place and secondary zone means where said cooling air is collected prior to ignition.

* * * * *